United States Patent [19]

Toda et al.

[11] 4,104,693

[45] Aug. 1, 1978

[54] GAS FILLED SURGE ARRESTER

[75] Inventors: Toshiharu Toda, Mitaka; Daizo Shigemori, Sagami-Hara, both of Japan

[73] Assignee: Reliable Electric Company, Franklin Park, Ill.

[21] Appl. No.: 778,992

[22] Filed: Mar. 18, 1977

[30] Foreign Application Priority Data

Mar. 23, 1976 [JP] Japan ................................ 51-034113

[51] Int. Cl.2 ................................................ H02H 9/06

[52] U.S. Cl. .................................... 361/120; 313/218; 313/346 R

[58] Field of Search ............................... 361/119, 120; 313/346 R, 218, 201

[56] References Cited

U.S. PATENT DOCUMENTS

| | | | |
|---|---|---|---|
| 1,797,683 | 3/1931 | Gross | 313/218 X |
| 3,676,743 | 7/1972 | Bahr et al. | 361/120 |
| 3,989,973 | 11/1976 | Lange et al. | 313/218 X |

FOREIGN PATENT DOCUMENTS

| | | | |
|---|---|---|---|
| 797,998 | 7/1958 | United Kingdom | 313/346 R |
| 943,535 | 12/1963 | United Kingdom | 313/346 R |

*Primary Examiner*—Harry E. Moose, Jr.
*Attorney, Agent, or Firm*—Olson, Trexler, Wolters, Bushnell & Fosse, Ltd.

[57] ABSTRACT

A gas-filled surge arrester includes a pair of electrodes extending inwardly of an insulating spacer. The electrodes have end faces which are aligned oppositely within the insulator to define an arc or discharge gap therebetween. Each of the electrodes includes at least one cavity formed in the end face thereof adjacent and extending away from the discharge gap. The cavities are lined with a substance of relatively high electron emission ability.

7 Claims, 3 Drawing Figures

GAS FILLED SURGE ARRESTER

BACKGROUND OF THE INVENTION

The present invention relates to surge arresters for communication circuits, such as telephone lines and the like.

The type of surge arrester with which the present invention is concerned is one that is intended primarily for protection of wire conductors and equipment connected thereto from electrical overvoltage conditions which may result from lightning, electrical power faults, and the like. Surge arresters for this purpose take various forms. Frequently, they are of the type that contain an arc gap across which the overvoltage will be applied causing conduction across the arc gap to ground. After the overvoltage condition has passed, the protector returns to its normal or non-conducting state. The arc gap may comprise spaced carbon electrodes separated by air, or the arc gap may be in a sealed gas-filled tube. The sealed gas tube arrester is essentially a cold cathode discharge tube generally comprising a pair of spaced metallic electrodes sealed to the ends of a cylindrical insulator. Gas tube arresters have a much greater useful life than arresters embodying carbon electrode air gaps.

Since the overvoltage condition which may be applied to a surge arrester are not constant in magnitude, there is a demand for such durable arresters that will withstand many surges of varying magnitudes as well as large currents. Two desirable qualities of a gas tube arrester, in this regard, are long service life and reliability. It is known that enlarging the sizes of the arrester components will generally satisfy these requirements. However, in many if not most applications this approach is not desirable because of limited installation space and because of the prohibitive cost of such large surge arresters.

It is also known to provide discharge surfaces of the opposing electrodes of various configurations such as grid surfaces or concaves. However, electrodes of such design still tend to discharge primarily between the opposing flat electrode surfaces and the electrodes tend to disperse metallic particles towards the surrounding insulator walls due to ion bombardment during discharge. A buildup of such metallic electrode material on the surrounding insulator walls tends to cause discharge to take place between electrode and wall as well as between opposed electrodes, and to decrease the effective insulation between the electrodes. Thus, such surge arrestors tend to become defective and exhibit a deterioration in their rated spark-over voltages.

OBJECTS AND SUMMARY OF THE INVENTION

Accordingly, it is an object of the present invention to provide an improved gas-filled surge arrester having improved reliability.

It is another object of the present invention to provide an improved gas-filled surge arrester having a longer service life.

It is another object of the present invention to provide a gas-filled surge arrester having stable operating characteristics.

It is another object of the present invention to provide a gas-filled surge arrester having electrodes adapted to minimize the dispersion of electrode particles towards the surrounding insulator walls during discharge.

It is another object of the present invention to provide a gas-filled surge arrester, in accordance with the foregoing objects which are of relatively simple and economical construction and of a relatively small size.

Briefly, a gas-filled surge arrester, according to the present invention, comprises a pair of electrodes and a generally cylindrical insulating member for electrically isolating the electrodes. The electrodes are attached to the insulating member by suitable means to create a hermetically sealed, gas-filled discharge member and to space the electrodes to form a discharge gap between inwardly extending opposed end faces thereof. Each of the electrodes includes at least one generally cylindrical cavity formed in the opposing end face thereof extending generally away from the discharge gap, the cavity being lined with a substance of low work function, i.e. a substance having a high electron emission ability as compared to the electron emission ability of the material of the adjacent surfaces of the electrodes.

The foregoing as well as other objects and other advantages of the present invention will become apparent from the following detailed description together with the accompanying drawings in which similar elements and components are designated by like reference numerals throughout.

DETAILED DESCRIPTION

Figure 1:
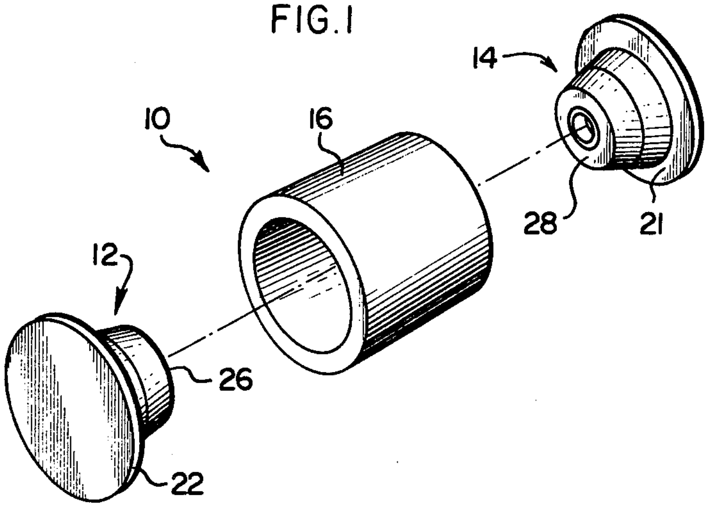
FIG. 1 is an exploded perspective view of a gas-filled surge arrester including features of the present invention.
Figure 2:
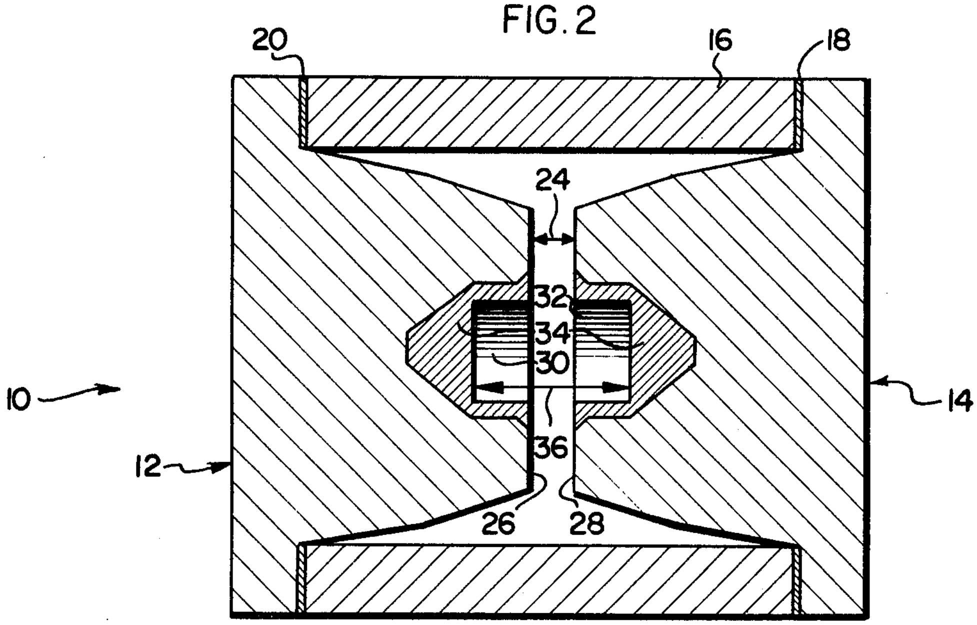
FIG. 2 is a cutaway side elevation of the gas-filled surge arrester of FIG. 1 assembled.

Referring now to FIGS. 1 and 2 a gas-filled surge arrester 10 comprises a pair of opposing electrodes 12 and 14 which are generally circular in cross-section and a generally cylindrical tube 16. The size of the assembled arrester is a relatively small cylinder and may be, by way of example, on the order of 9.5 millimeters high and on the order of 8 millimeters in diameter. The electrodes 12 and 14 are formed of a suitable metallic conductor material such as a nickel-iron-cobalt alloy known as Kovar, and the tube 16 is formed of a suitable insulating material such as a ceramic material, glass or alumina. Preferably, the electrodes 12,14 are of "solid" rather than of sheet metal construction. The electrodes 12 and 14 are generally frusto-conical in shape and are attached to opposite ends of the tube 16 by suitable means such as rings of brazing material 18 and 20. The electrodes 12 and 14 are provided with suitable generally annular lips or flanges 21 and 22 at their outer or bottom ends to cooperate with the opposite ends of tube 16 and the rings of brazing material 18 and 20 interposed therebetween to form the assembled arrester 10. Thus, the surge arrester may be assembled, as for example, by heating in a vacuum oven to exhaust the electrodes and the ceramic tube of gases and to fuse the rings of brazing material 18 and 20 in an atmosphere of rare or inert gases, thereby welding said electrodes 12 and 14 to the tube 16 to form a gas-filled surge arrester 10. The tube 16 is of suitable length so that the electrodes 12 and 14 when assembled therewith define an arc gap 24 between their inwardly extending opposing faces 26 and 28. The opposing end faces 26,28 are generally circular and may be, for example, on the order of 4.4 mm. in diameter.

Figure 3:
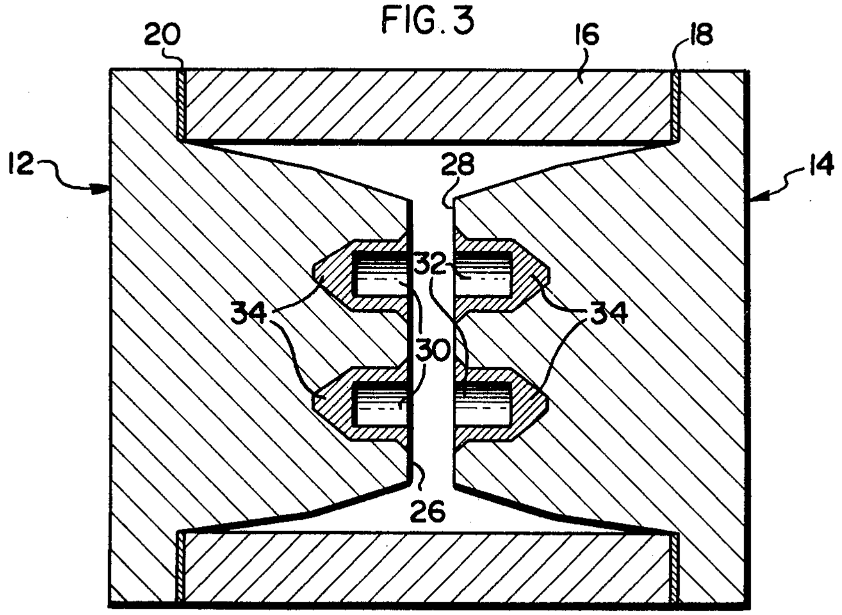
FIG. 3 is a cutaway side elevation of an alternative embodiment of the gas-filled surge arrester of FIG. 2.

In accordance with the present invention, the opposing faces 26 and 28 of the electrodes 12 and 14 are provided with at least one pair of generally cylindrical opposing cavities 30 and 32 extending inwardly of the faces 26 and 28, respectively, and away from the arc gap 24. The cavities 30,32 may be, for example, on the order of 1.5 mm. deep and on the order of 1 to 2 mm. in diameter, their diameter depending upon the number of cavities provided. The cavities 30 and 32 are lined with a substance of relatively high electron emission ability as compared to the metallic or "Kovar" surfaces of faces 26,28 that are remote from the cavities 30,32. It will be understood that the cavities 30 and 32 may comprise a single pair of opposed cavities as illustrated in FIG. 2, two pairs of opposed cavities, as illustrated in FIG. 3 or any suitable number of opposed pairs of cavities.

It will also be noted that the distance 36 between the end walls of the cavities 30,32 is greater than the gap 24 between the electrode faces 26,28. Further, the material 34 completely lines the cavities 30,32 so that a relatively thin, generally annular ring of the material 34 is present substantially coplanar with the electrode faces 26 and 28, respectively.

It is advantageous at this point to describe briefly the desirable physical properties of the material 34 lining the cavities 30 and 32 which is a substance of relatively high electron emission ability. It will be noted that electron emission ability is a property also commonly referred to as the "work function" of a material, a high electron emission ability corresponding to a low work function. The substance 34 is then, preferably such that it will emit electrons, that is to say, encourage discharge of the arrestor, at a relatively lower voltage than the adjacent electrode material. Thus, discharge will tend to occur between the lining 34 of the cavities 30 and 32, rather than between the faces 26,28 of the electrodes 12,14. The material 34 is chosen to have an electron emission ability such that this holds true even though the gap 24 between the opposing faces 26,28 may be narrower than that between the opposing lined cavities 30,32.

Thus, the choice of the material 34 lining the cavities 30,32 together with the gap therebetween will determine the discharge voltage of the arrestor. It will be obvious, then, that the gap may be considerably wider with the proper choice of material 34, than in prior art devices having electrodes without such a material. This alleviates the problems of the prior art associated with setting relatively small, critical gap sizes, resulting in a high possibility of error, and difficulties in obtaining devices having accurate and predictable discharge voltages. The somewhat larger gap size made possible by the use of the material 34 along with the provision of the cavities 30 and 32 also tends to discourage dispersion of particles from the electrodes, during discharge, to the surrounding insulator walls, or to the electrode faces 26 and 28, as will be explained below. This alleviates another problem with prior art devices, as a buildup of such dispersed particles tends to either provide parallel or shortened discharge paths in the arrestor, or short out the electrodes completely, often resulting in unreliable and unstable operating characteristics and shortened service life.

The amount of the substance to be applied to the cavities and the relative proportions of the ingredients thereof depends, of course, on the desired operating characteristics and particularly the discharge voltage to be obtained. Thus, the following are given as specific examples to which no limitation is intended. One such substance comprises a mixture comprising sodium silicate solution of a concentration of between substantially 20 to 40% and titanium powder suspended therewith in a proportion of between substantially 2% and 8%. Another suitable substance comprises a mixture of barium azide solution of a concentration of between substantially 3% and 10% and titanium powder suspended therewith in a proportion of between substantially 2% and 8%. Either of the above mixtures can be applied to the cavities by suspension of the mixture in water and filling of the cavity with the mixture and then heating the electrode to a sufficient temperature to make the mixture dry so that it becomes part of the cavity. Alternatively, either of the above solutions may be applied to the cavities by suspending the solution in water, dipping a small applicator or stick into the suspension, applying the wet tip of the stick or applicator to the cavity and heating to remove the water and dry the suspension in place surrounding the inner surfaces of the cavity. As a further example, a suitable suspension for application to the cavities and described above may be prepared by dissolving 20 grams of sodium silicate and one gram of titanium powder in 50 cc of distilled water; alternatively, a suitable suspension may be prepared by dissolving 10 grams of barium powder and 30 grams of titanium powder in 50 cc of distilled water.

In arresters constructed and prepared as described above, it is believed that discharges tend to occur between the lined cavities of the electrode surfaces. The lining substance promotes discharge in this fashion, facilitating a stable operating characteristic. The electrodes, acting as cathodes, tend to disperse particles, even if subjected to ion bombardment during discharge, mainly within the respective lined cavities. Thus, most of the dispersed particles remain in or return to the cavities from which they have been dispersed and become attached thereto rather than to the surrounding insulator walls 16 or the opposed faces 26,28 of the electrodes 12 and 14. This minimizes the deterioration of the insulation and substantially maintains the discharge gap, resulting in a minimal variation of the breakdown voltage. Thus, the arrestor exhibits improved reliability and a longer service life as well as a stable operating characteristic.

The specific embodiments herein shown and described are to be considered as primarily illustrative. Various changes in structure beyond that described will, no doubt, occur to those skilled in the art and are to be understood as forming a part of this invention insofar as they fall within the spirit and scope of the appended claims.

The invention is claimed as follows;

1. A gas-filled surge arrester comprising a generally cylindrical tubular insulator member, a pair of electrodes of substantially uniform composition having opposed generally planar end faces, said electrodes being hermetically sealed to opposite ends of said insulator member, said insulator member, serving to isolate electrically said electrodes and to space apart said opposed end faces to define a discharge gap therebetween, said electrodes including at least one pair of opposed cavities formed as recesses in the end faces, the cavity in each face being of a size as to occupy less than the full end face area and the cavities having respective end walls which are spaced apart a distance greater than the width of said gap, said cavities being lined with a substance of high electron emission ability relative to that of the adjacent electrode material at said gap, said substance in each cavity forming a ring substantially coplanar with the associated end face and the depth and width of the cavities being such that the discharge tends to take place between said lined cavities to discourage dispersion of particles from the electrodes during discharge onto the insulator member.

2. A gas-filled surge arrester according to claim 1 wherein said substance comprises Titanium and sodium silicate.

3. A gas-filled surge arrester according to claim 2 wherein said substance comprises a suspension of titanium powder of between substantially 2% and 8% in a sodium silicate solution of between substantially 20% and 40%.

4. A gas-filled surge arrester according to claim 1 wherein said substance comprises Titanium and Barium.

5. A gas-filled surge arrester according to claim 4 wherein said substance comprises a suspension of Titanium powder of between substantially 2% and 8% in a Barium Azide solution of between substantially 3% and 10%.

6. A gas-filled surge arrester according to claim 1 wherein said electrodes include a plurality of said pairs of opposed cavities.

7. A gas filled tube according to claim 1 in which said electrode faces adjacent to said cavities are of a nickel-iron-cobalt alloy.

* * * * *